(12) United States Patent
Bryzek

(10) Patent No.: US 9,894,891 B2
(45) Date of Patent: Feb. 20, 2018

(54) STRIKE INDICATOR FISHING SYSTEM

(71) Applicant: Michael Bryzek, Anaconda, MT (US)

(72) Inventor: Michael Bryzek, Anaconda, MT (US)

( * ) Notice: Subject to any disclaimer, the term of this patent is extended or adjusted under 35 U.S.C. 154(b) by 311 days.

(21) Appl. No.: 14/314,280

(22) Filed: Jun. 25, 2014

(65) Prior Publication Data

US 2015/0000175 A1 Jan. 1, 2015

Related U.S. Application Data

(60) Provisional application No. 61/840,560, filed on Jun. 28, 2013.

(51) Int. Cl.
*A01K 97/12* (2006.01)
*A01K 97/01* (2006.01)

(52) U.S. Cl.
CPC .............. *A01K 97/12* (2013.01); *A01K 97/01* (2013.01)

(58) Field of Classification Search
CPC ........ A01K 97/12; A01K 97/01; A01K 93/00; A01K 93/02
USPC ....................................... 43/16, 17
See application file for complete search history.

(56) References Cited

U.S. PATENT DOCUMENTS

| | | | |
|---|---|---|---|
| 880,045 A * | 2/1908 | Ruggles | A01K 97/125 43/17 |
| 1,803,914 A | 5/1931 | Oberg | |
| 2,170,000 A | 10/1939 | Eggleston | |
| 2,530,864 A | 4/1948 | Easterday | |
| 2,502,231 A | 3/1950 | Oberg | |
| 2,624,972 A | 1/1953 | Burg | |
| 2,651,875 A | 9/1953 | Brockman | |
| 2,654,176 A * | 10/1953 | Kachelski | A01K 97/01 43/17 |
| 2,786,294 A | 6/1956 | Whitacre | |
| 2,931,122 A | 4/1960 | Barrows | |
| 3,025,852 A | 3/1962 | Quilling | |
| 3,034,247 A | 5/1962 | Lunsman | |
| 3,196,570 A | 4/1965 | Borisch | |
| 3,187,456 A | 6/1965 | Apitz | |
| 3,190,026 A | 6/1965 | Roszak | |
| 3,352,048 A | 11/1967 | Fleming | |
| 3,359,673 A | 12/1967 | Roemer | |
| 3,423,867 A * | 1/1969 | Bartletti | A01K 97/01 43/17 |
| 3,641,693 A | 2/1972 | Pinnow | |
| 3,807,078 A * | 4/1974 | Bartys | A01K 97/01 43/17 |
| 4,183,076 A | 1/1980 | Bodde | |
| 4,270,297 A * | 6/1981 | Yates | A01K 97/01 43/17 |
| 4,300,303 A | 11/1981 | Hutson | |
| 4,528,554 A | 7/1985 | Klefbeck | |

(Continued)

*Primary Examiner* — Christopher P Ellis
*Assistant Examiner* — Magdalena Topolski
(74) *Attorney, Agent, or Firm* — Haffey Vap PLLC; John F. Haffey; Mitchell J. W. Vap

(57) ABSTRACT

A strike indicator fishing system comprising of a means of visual notification of a fish strike that is easy to quickly set up using magnet line securing means. The system has a signal flag that is placed in a pre-strike position by connecting it to a fishing line by using clasp magnets to grab and hold the fishing line. The fishing line is also passed through a slip bobber containing an anti-freeze material to prevent icing of the fishing line that would interfere with the fish strike indicator.

3 Claims, 3 Drawing Sheets

(56) References Cited

U.S. PATENT DOCUMENTS

| | | | |
|---|---|---|---|
| 4,571,876 A * | 2/1986 | LeClair | A01K 97/01 43/17 |
| 4,942,687 A | 7/1990 | Post | |
| 4,945,668 A | 10/1990 | Keller | |
| 5,005,310 A | 4/1991 | Rinehart | |
| 5,598,656 A | 2/1997 | Strasser | |
| 5,832,652 A | 11/1998 | Bartys | |
| 6,354,036 B1 | 3/2002 | Carlson | |
| 6,857,218 B1 | 2/2005 | Grahl | |
| 6,857,221 B2 | 2/2005 | Johnson | |
| 7,032,343 B1 | 4/2006 | Foss | |
| 7,062,877 B1 | 6/2006 | Koch | |
| 7,266,923 B2 * | 9/2007 | Hubscher | A01K 97/01 43/44.87 |
| 7,343,708 B2 | 3/2008 | Pieczynski | |
| 7,818,913 B1 | 10/2010 | Hogland | |
| 7,992,341 B1 | 10/2011 | Renstrom | |
| 8,375,621 B1 * | 2/2013 | Tarr | A01K 97/12 43/16 |
| 2005/0166442 A1 * | 8/2005 | Schiemann | A01K 97/01 43/17 |
| 2005/0204606 A1 | 9/2005 | Phillips | |
| 2007/0169394 A1 * | 7/2007 | Keller | A01K 97/01 43/17 |
| 2009/0139130 A1 | 6/2009 | Nozzarella | |
| 2014/0068995 A1 | 3/2014 | Galbraith | |

\* cited by examiner

STRIKE INDICATOR FISHING SYSTEM

CROSS-REFERENCE TO RELATED APPLICATIONS

This application claims the benefit of U.S. Provisional Application No. 61/840,560 filed Jun. 28, 2013, the disclosure of which is incorporated herein by reference.

FIELD OF THE INVENTION

The present invention relates to an easy to set-up strike indicator that provides a visual means to notify a fisherman of a fish strike by utilizing magnets as the securing means from the visual indicator to the fishing line, and further providing for prevention of fishing line freeze in ice fishing applications.

BACKGROUND OF THE INVENTION

Various fish strike indicators have been used by fishermen to increase the efficiency and ease of fishing, especially when a fishermen is fishing multiple lines. Numerous structural arrangements have been used to connect the fishing line to the signaling means. Most devices are overly complex, cumbersome, and are prone to false signals. All of which cause increased effort, loss of efficiency, and loss of enjoyment for the fisherman. The present invention incorporates easy to use magnetic means to secure the fishing line to the signaling means. The simplicity of the invention allows for quick and easy set-up, and easy tension adjustment to apply to almost any fishing application. Additionally the devices are very compact and easy to store and transport. Finally the invention allows for anti-line freezing for ice fishing applications.

SUMMARY OF THE INVENTION

It is an objective of the present invention to provide an easy to use strike indicator system for ice fishing, and other types of fishing, that simplifies complex structural arrangements by utilizing magnets as the means to go from strike to signal. Another object of the invention is to allow incorporation of an antifreeze slip through bobber to prevent line freeze up that could interfere with the strike signaling operation. Another object of the invention is to allow for quick connect and disconnect of a tip up flag to a fishing pole through the use of a pole grasping clamp.

The invention utilizes a magnetic clasp that attaches to a flag post through a flexible line. By pulling the clasp down to the fishing line coming off of a fishing reel or spool, the user can set the flag in a pre-strike (down) position by opening the clasp and placing the line between the two magnets and allowing the magnets to come back together thereby holding the fishing line in place due to the tension provided by the magnetic forces pressing against the fishing from the magnetic attraction between the two magnets. The magnets can be sized for different forces of magnetic attraction, thereby controlling the required line tension that is needed to separate the magnetic clasps from each other and thereby allowing the flag to spring up.

Another aspect of the invention utilizes a floating base that relies on the same principal of having a fish strike cause two clasping magnets to separate from each other and allow a flag to be released from a pre-strike position. In that situation a fishing line travels through a tube that has a magnetic platform. A magnetic bell, which is attached to a flag post through a flexible line, sets on the magnetic platform through magnetism. Again, the magnets can be sized to allow for different line tensions required to disrupt the magnetic forces and release the two magnets. The line is held in place between the platform and the bell in a pre-strike position.

Both aspects of the invention can be used with line anti-freeze tubes that provide for anti-freeze materials to surround, or be adjacent to, the line as it makes the transition from being exposed to air and the water. The anti-freeze tubes insulate the line by using anti-freeze material, such as a anti-freeze gel made from petroleum jelly, mineral oil, vegetable oils or any mixture of them, as well as standard non-pollutant antifreeze liquids on the market.

DESCRIPTION OF PREFERRED EMBODIMENT

Figure 1:
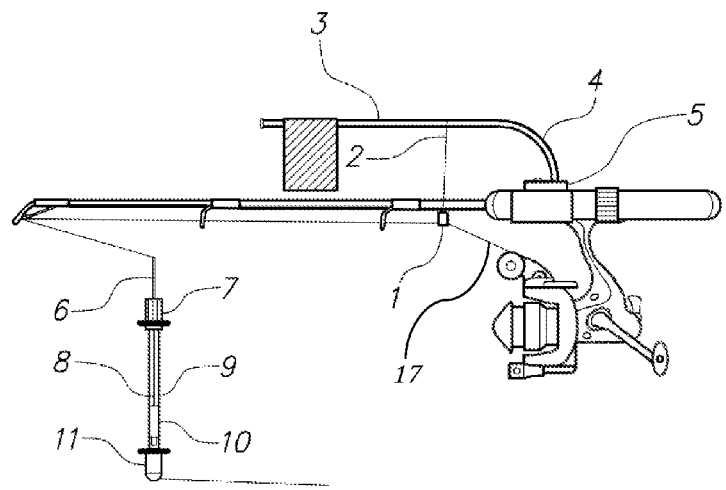
FIG. 1 shows an embodiment of the invention comprising of a flag signaling means, consisting of a pole mount, spring, flag post, flag, connection line from flag post to clasping magnet for a fishing line, as well as the antifreeze slip through bobber.

Although only two embodiments are explained in detail, they are to be understood as illustrations only, and not intended to limit the invention in its scope. Also, in describing the embodiments specific terminology may be used, but it should be understood that specific terms include all technical equivalents that operate in similar manners to accomplish similar purposes.

With reference to the drawings, a preferred embodiment of this invention is illustrated in FIGS. 1, 3, 4, 5. The apparatus generally comprises a magnetic clasp 1 that holds the line coming off the spool 17. The magnetic clasp 1 is connected to a line 2 that is in turn connected to a lightweight rod 3 with a high visibility flag on the end. The other end of the rod 3 is secured to a common flexible spring 4, which can be adjusted for flag release tension. The flexible spring 4 is connected to a spring base 5 that is able to be quickly attached and detached to the fishing pole by clasping means or other means such as Velcro®. The fishing line extended through the pole tip then travels through a small diameter hollow tube 6, which is positioned within a larger diameter tube 8. The larger tube 8 has a cap 7 that seals itself and centrally positions the smaller tube 6, within it. The larger tube 8 is filled with a petroleum jelly mixture 9 that prevents freezing. Finally an end cap 11 seals tube 8 and centrally positions tube 6, which allows the fishing line to exit the anti-freeze tube apparatus.

Figure 2:
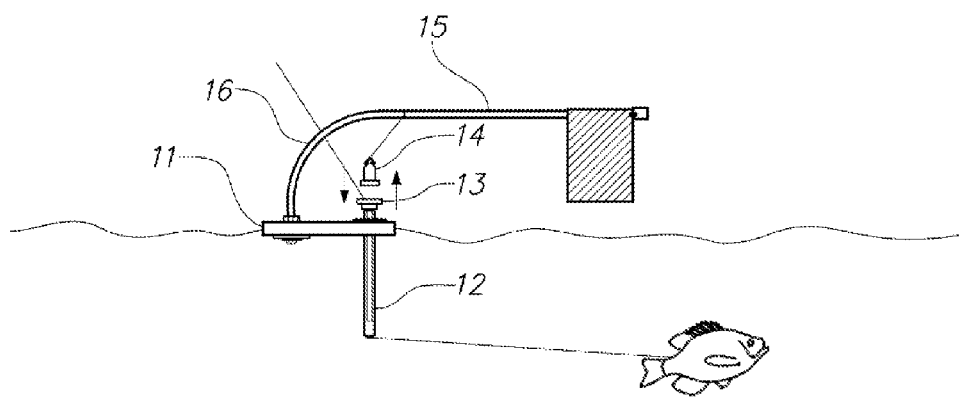
FIG. 2 shows an embodiment of the invention comprising of a floating platform with an attached flag signaling means, comprising of a spring, flag post, flag, connection line from flag post to magnet. Also attached through the floating platform is an antifreeze sleeve allowing pass through of the fishing line with a magnetic top.
Figure 3:
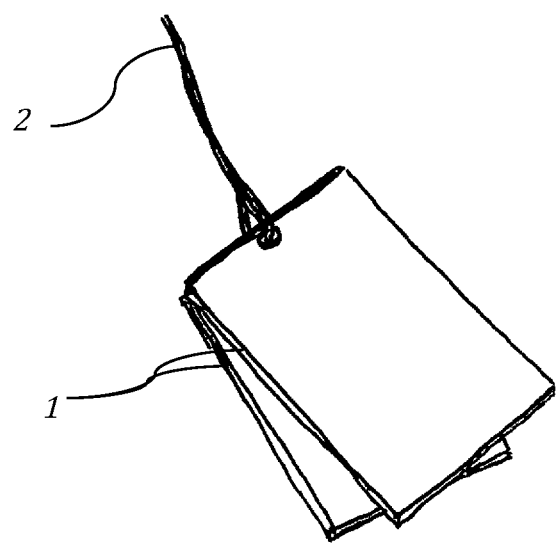
FIG. 3 shows a perspective view of the magnetic clasping means connected to the flag post connecting line.
Figure 4:
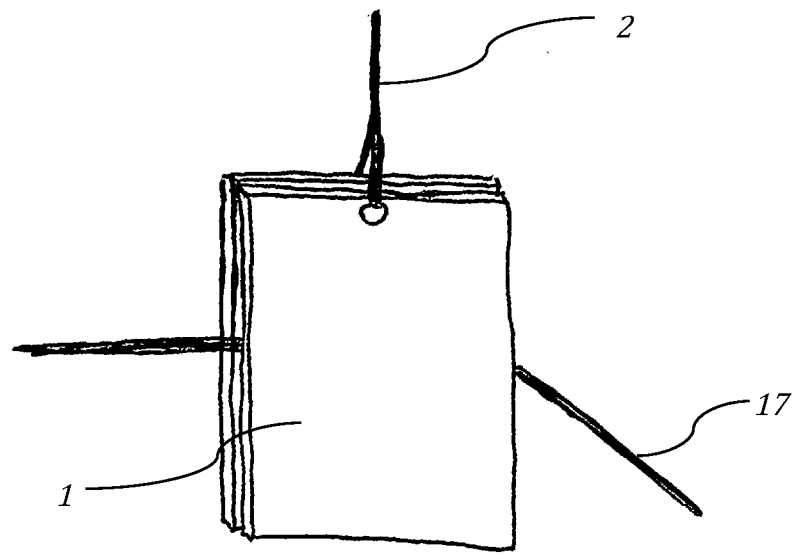
FIG. 4 shows a perspective view of the magnetic clasping means that is connected to the flag post connecting line, and secured to the fishing line coming off the spool.
Figure 5:
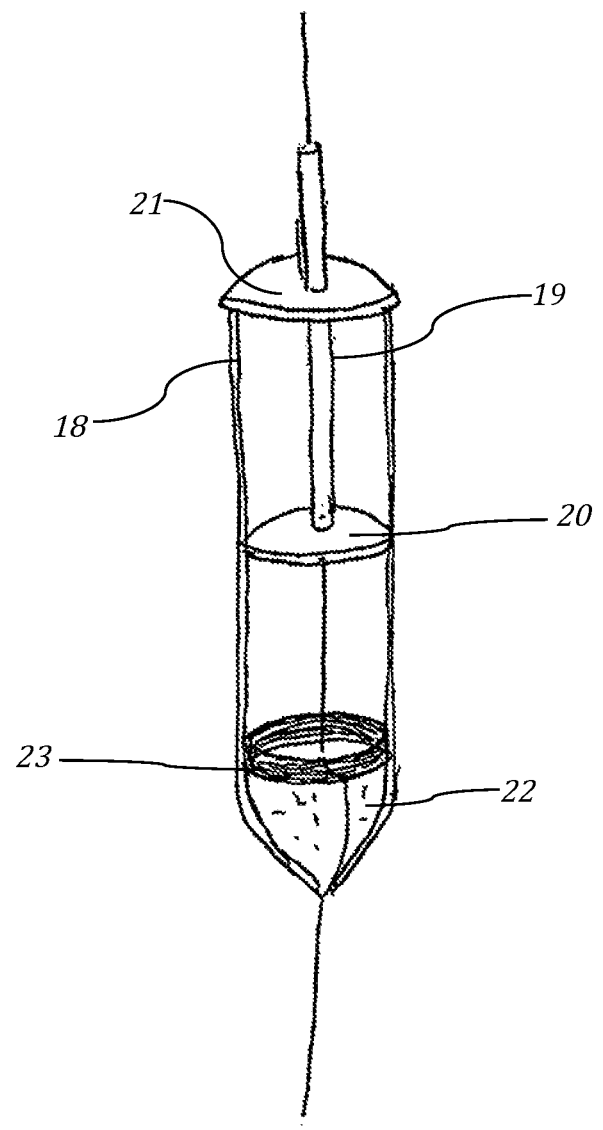
FIG. 5 shows a perspective view of an embodiment of the anti-freeze bobber showing the plunger, sponge, and holding ring configuration.

With reference to FIG. 5, an embodiment showing a variation of the anti-freeze bobber having a hollow outer tube 18 having a top and bottom opening, wherein the bottom opening is tapered to a point of sufficient size to allow a fishing line to pass through Another embodiment of the invention is shown in FIG. 2. The apparatus generally comprises a foam floating platform 11, which has a flexible spring 16 mounted to the platform, at the other end, the flexible spring 16 is attached to a light weight flag post that has a high visibility flag at the other end. The platform 11 also has a hole within which a hollow tube 12 is secured through it. At the top end of tube 12 has an attached magnetic platform 13 with a center hole where the fishing line goes through. A magnetic set bell 14 is attached to a line which in turn is connected to the flag post 15. The flag post is then set in the down position by securing the set bell 14 to the magnetic platform 13, with the fishing line pinched between the two. Once the fishing line receives sufficient tension from a fish strike, it will break the magnetic connection between the set bell 14 and the platform 15, thereby allowing the flag to spring up to alert the fisherman.

I claim:

1. A strike indicator fishing system comprising:
   a strike flag base for attachment to a fishing pole through a strike flag base securing means;
   a flexible spring having a first and second end, wherein said first end is attached to the strike flag base through a spring securing means;
   a flag post having a first and second end, wherein the first end is connected to the second end of the flexible spring;
   a high visibility flag secured to the flag post proximate to its second end;
   a flag post connecting line having a first and second end, wherein the first end is connected to the flag post;
   a magnetic clasping means attached to the second end of the flag post connecting line, wherein the magnetic clasping means secures to a fishing line within it thereby placing the strike indicator fishing system into a pre-fish strike (down) position;
   and further comprising an anti-freeze bobber having;
   a hollow plunger tube having a top and bottom end, wherein the fishing line passes through;
   a hollow outer tube having a top and bottom opening, wherein the bottom opening is tapered to a point of sufficient size to allow the fishing line to pass through with minimal clearance;
   a plunger disc having a center hole secured to the bottom end of the hollow plunger tube, wherein the plunger disc is sized for fitting within the hollow outer tube with minimal clearance;
   an end cap having a center hole for capping the top end of the hollow outer tube and centrally positioning the hollow plunger tube within the hollow outer tube, wherein the center hole of the end cap is sized for a tight fit around the hollow plunger tube; and
   an anti-freeze jelly for filling the volume of the hollow outer tube beneath the plunger disc.

2. The strike indicator fishing system according to claim 1, further comprising a sponge positioned within the hollow outer tube proximate to the tapered bottom opening, wherein the sponge has a vertical slit for placement of the fishing line.

3. The strike indicator fishing system according to claim 2, further comprising a ring sized for snug fitting within the hollow outer tube, wherein the ring holds the sponge in place proximate to the tapered bottom opening.

* * * * *